US007664530B2

(12) United States Patent
Skelton

(10) Patent No.: US 7,664,530 B2
(45) Date of Patent: Feb. 16, 2010

(54) METHOD AND SYSTEM FOR AUTOMATED PLANNING USING GEOGRAPHICAL DATA

(75) Inventor: Christopher Skelton, Coshocton, OH (US)

(73) Assignee: AT&I Intellectual Property I, L.P, Reno, NV (US)

( * ) Notice: Subject to any disclaimer, the term of this patent is extended or adjusted under 35 U.S.C. 154(b) by 587 days.

(21) Appl. No.: 11/449,825

(22) Filed: Jun. 9, 2006

(65) Prior Publication Data

US 2007/0288159 A1    Dec. 13, 2007

(51) Int. Cl.
*H04M 1/00* (2006.01)
(52) U.S. Cl. ............ 455/556.2; 455/425; 455/67.11; 455/446; 455/456.1; 707/10; 707/100; 379/1.03; 379/9.02; 701/207
(58) Field of Classification Search ...... 455/422.1–425, 455/67.11, 446, 556.1–557; 707/10, 100; 379/1.01, 1.03, 9.02, 10.03
See application file for complete search history.

(56) References Cited

U.S. PATENT DOCUMENTS

| | | | | |
|---|---|---|---|---|
| 5,023,900 | A * | 6/1991 | Tayloe et al. ............ | 379/32.01 |
| 5,404,661 | A * | 4/1995 | Sahm et al. .................. | 37/348 |
| 5,606,604 | A * | 2/1997 | Rosenblatt et al. .......... | 379/198 |
| 5,809,415 | A * | 9/1998 | Rossmann ............... | 455/422.1 |
| 5,842,210 | A * | 11/1998 | Chen et al. .................... | 707/10 |
| 5,990,932 | A * | 11/1999 | Bee et al. ................. | 348/14.08 |
| 6,083,353 | A * | 7/2000 | Alexander, Jr. ............. | 202/158 |
| 6,336,035 | B1 * | 1/2002 | Somoza et al. .............. | 455/446 |
| 6,662,193 | B1 * | 12/2003 | Christensen ............ | 707/104.1 |
| 6,751,553 | B2 | 6/2004 | Young et al. | |
| 6,771,956 | B1 * | 8/2004 | Beeler ........................ | 455/423 |
| 6,792,269 | B2 * | 9/2004 | Boehmke .................... | 455/424 |
| 6,826,385 | B2 * | 11/2004 | Kujala ........................ | 455/13.1 |
| 6,961,586 | B2 | 11/2005 | Barbosa et al. | |
| 6,985,941 | B2 * | 1/2006 | Schweitzer et al. ......... | 709/224 |
| 7,003,284 | B2 * | 2/2006 | Schwartz et al. ......... | 455/414.1 |
| 7,035,642 | B2 * | 4/2006 | Rappaport et al. .......... | 455/446 |
| 7,139,564 | B2 * | 11/2006 | Hebert ....................... | 455/423 |
| 7,155,167 | B1 * | 12/2006 | Carty ...................... | 455/67.11 |
| 7,283,810 | B1 * | 10/2007 | Arakawa et al. ......... | 455/414.1 |
| 7,463,884 | B2 * | 12/2008 | Majmundar et al. ......... | 455/419 |
| 7,596,386 | B2 * | 9/2009 | Yach et al. ............... | 455/556.1 |
| 2002/0123338 | A1 * | 9/2002 | Iyer ........................... | 455/423 |
| 2002/0136374 | A1 | 9/2002 | Fleischer, III et al. | |

(Continued)

OTHER PUBLICATIONS

"LME—Utility Mapping, Mapping Utility Company Facilities with GPS," http://www.landandmapping.com/util_map.html, pp. 1-5, downloaded Apr. 20, 2006.

(Continued)

*Primary Examiner*—Sharad Rampuria
(74) *Attorney, Agent, or Firm*—Greenblum & Bernstein, P.L.C.

(57) ABSTRACT

A portable device for collecting data at a geographic location and providing accurate, comprehensive, efficient and timely work prints. The portable device for collecting data at a geographic location, the device including a memory that stores preliminary site information associated with the geographic location; a receiver that receives geographic position data of at least one point at the geographic location; an interface that enables a user to input data corresponding to the received geographic position data; and a processor that supplements the preliminary site information with the received geographic position data and the corresponding input data.

20 Claims, 10 Drawing Sheets

U.S. PATENT DOCUMENTS

| | | |
|---|---|---|
| 2004/0128313 A1 | 7/2004 | Whyman |
| 2004/0192329 A1* | 9/2004 | Barbosa et al. ......... 455/456.1 |
| 2005/0186915 A1* | 8/2005 | Williams ................ 455/67.11 |
| 2007/0037570 A1* | 2/2007 | Donovan et al. ............ 455/423 |
| 2008/0086391 A1* | 4/2008 | Maynard et al. .............. 705/28 |

OTHER PUBLICATIONS

"Ares download in File Sharing & Peer to Peer downloads," http://www.yankeedownload,com/free-download/7080/ares.html, pp. 1, 6-8, downloaded Apr. 20, 2006.

"GPS Handheld enables high-accuracy mapping, Trimble Navigation Limited," http://news.thomasnet.com/fullstory/471719, pp. 1-4, downloaded Apr. 20, 2006.

Department of the Army, US Army Corps of Engineers, Manual No. 1110-1-1003, "Engineering and Design, Navstar Global Positioning System Surveying" (Publication No. EM 1110-1-1003; Publication Date: Jul. 1, 2003), Chapter 9: "Conducting GPS Field Surveys," pp. from 9-1 to 9-36.

* cited by examiner

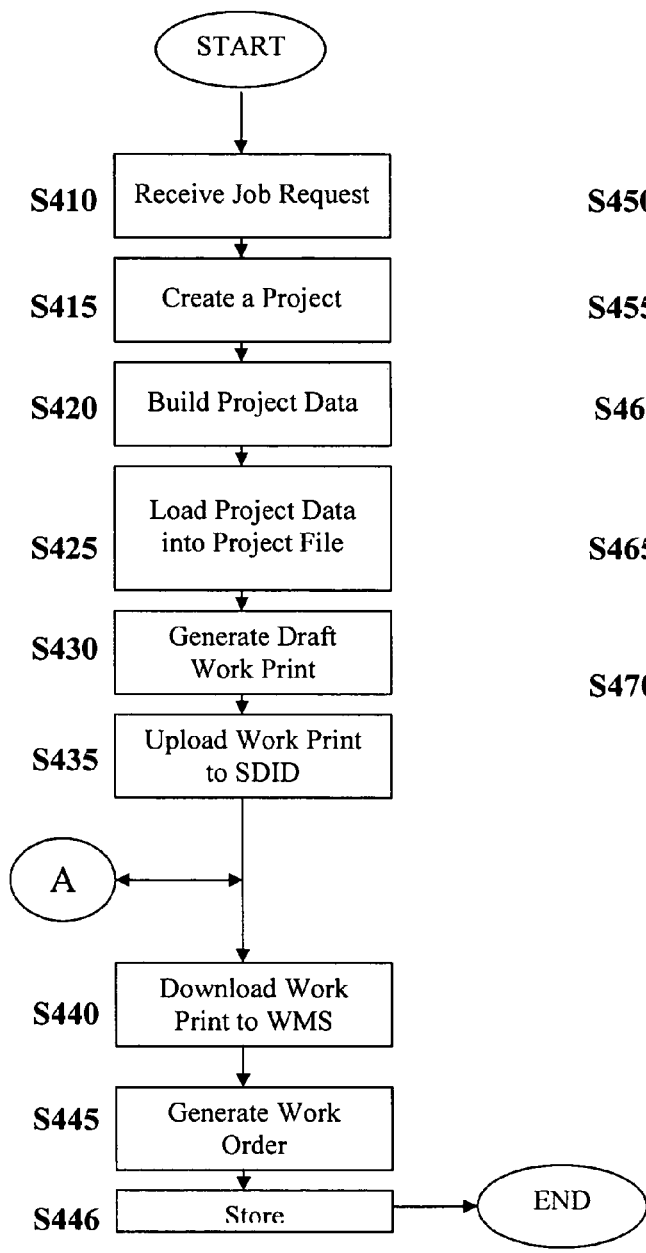
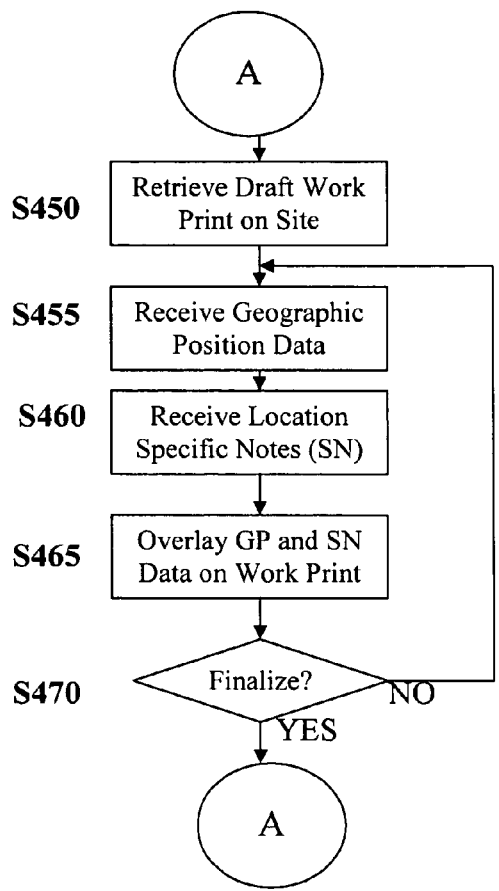
FIG. 4A
FIG. 4B

METHOD AND SYSTEM FOR AUTOMATED PLANNING USING GEOGRAPHICAL DATA

BACKGROUND OF THE DISCLOSURE

1. Field of the Disclosure

The present disclosure relates to the field of engineering. More particularly, the present disclosure relates to gathering, managing and outputting site specific planning or other such location specific information correlating to geographical data.

2. Background of the Disclosure

Currently, project management entities survey worksites and other geographically specific locations in order to develop work prints by sending field engineers to these work sites. A field engineer typically may carry, for example, a preliminary work print, a notebook, a cellular telephone, a camera, and the like. Once at the work site, the engineer may use a measuring wheel to measure and record geographic information. The engineer takes separate notes on such observations as field hazards, placement of items such as culverts, and fence lines, and required work such as boring, tree trimming, bonding and grounding, to name a few.

The field engineer then returns to the office and manually records the various field notes on a work type print. The print is then given to a draftsman to create an actual work print. This process includes accessing and reviewing data on the availability and pricing of items to be included in the planned work. Then, the completed work print is returned to the engineer for review and approval. If the work print is approved, the print is forwarded to a construction engineer for implementation.

Presently, the field engineer may use a Global Positioning System (GPS) unit at the work site to determine geographic information, thus simplifying certain surveying steps, but the field engineer still separately records associated site observations and/or corresponding work requirements. Also, the engineer must still transcribe field notes (including the geographic information) into a final work print or the like.

Accordingly, there is a need to reduce the time and cost of generating work prints and similar site planning documentation, while simultaneously increasing accuracy and comprehensiveness.

BRIEF DESCRIPTION OF THE DRAWINGS

The present disclosure is further described in the detailed description that follows, by reference to the noted drawings by way of non-limiting examples of embodiments of the present disclosure, in which like reference numerals represent similar parts throughout the several views of the drawings:

FIGS. 4A and 4B are flow diagrams showing exemplary on-site survey process, according to an aspect of the present disclosure;

DETAILED DESCRIPTION OF THE DISCLOSURE

Figure 1:
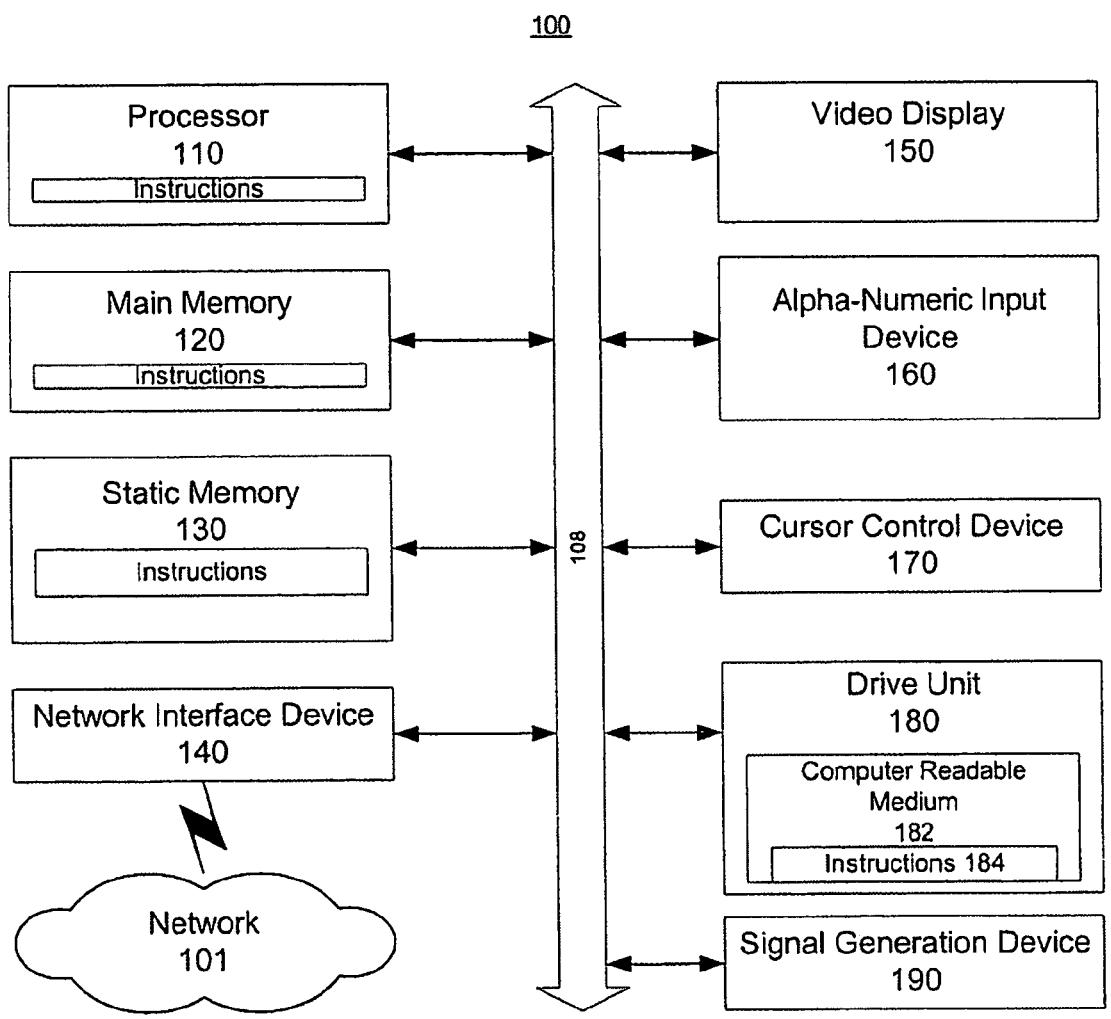
FIG. 1 illustrates a generic embodiment of a general computer system, according to an aspect of the present disclosure.

A portable smart data input device (SDID), which is connectable to a work management system (WMS), includes the capability to determine geographic position information in real time, e.g., through a GPS receiver. This allows a user, such as a field engineer surveying a potential work site, to download initial data from the WMS, such as draft work print data or other such site planning information, as well as upload additional data to the WMS. Typically, a work print is a two-dimensional plat, including geographically specific site information such as road boundaries, building structures, manholes, fire hydrants, and telephone poles.

The exemplary system of the present disclosure allows the user to visit a specific geographic location, such as a proposed work site, with the SDID. The SDID is able to download data in real time from the WMS, or to retrieve previously stored data from a memory device. The SDID enables the user to input field notes corresponding to exact geographic locations provided by an integrated GPS receiver or other associated geographic positioning system. The field notes may be overlaid in real time onto a work print, for example, that has been downloaded from the WMS or previously stored in the memory of the SDID, which may be internal or external to the SDID. For example, the SDID enables the user to create station markers and to plot locations directly onto the work print. Alternatively, the field notes may be stored and later overlaid onto the work print. The work print may have been generated on the SDID.

The SDID may automatically download information to the WMS when connected. The WMS then processes the downloaded information to generate a work order, for example, including information such as terminals, closures, poles, cables, etc. for the project, as well as the geographic locations of each, as determined on-site. The WMS may use artificial intelligence such as, for example, fuzzy logic, adaptive neural processing or rules-based expert systems. The downloaded information will include input notes, such as field hazards, placement issues such as culvert locations, boring, tree trimming, fence lines, bonding and grounding, and the like. Additionally, the WMS and/or the SDID provide access to standard nomenclature, such as of construction materials.

The WMS forwards the work order and/or work print to a construction manager, or other entity for ultimate implementation. The construction manager may be a machine system, which uses artificial intelligence such as, for example, fuzzy logic, adaptive neural processing or rules-based expert systems.

In an exemplary aspect of the disclosure, a portable device is disclosed for collecting data at a geographic location comprising site information. The exemplary portable device comprises: a receiver that receives geographic position data of at least one point at the location; an interface that enables a user to input data corresponding to the at least one point; a processor that automatically supplements the site information with the received geographic position data and the corresponding input data of the at least one point; and a memory that may store the geographic position data and the corresponding input data of the at least one point, and the supplemented site information.

The exemplary portable device may comprise a GPS receiver and the site information may comprise a work print indicating at least one action to be performed at the location. Alternatively and/or additionally, the site information may comprise a topographical plat or a warehouse plan including inventory information. The exemplary portable device may comprise at least one input/output port configured to be coupled to at least one supplemental device, which may be any one of, or combination of, a satellite signal receiver, a radio frequency signal receiver, a memory card, a range finder, a telephone, and a camera. The exemplary device may also comprise a transceiver configured to communicate with a remote work station, the supplemented site information being downloadable to the work station through the transceiver. The exemplary interface may comprise at least one function activation key configured to execute a predetermined function that provides at least one user selectable choice for the input data.

The exemplary portable device may also comprise a range finder and/or a camera. The exemplary range finder may be configured to determine a distance to a remote object and the processor may be configured to determine a geographic position of the remote object based on the received geographic position data and the determined distance to the remote object. The exemplary camera may be configured to capture a still or moving image that may be displayed on a display of the interface, and the memory may be configured to store the image in association with at least one of the geographic position data and the corresponding input data of the at least one point.

In an exemplary aspect of the disclosure, a work management method is disclosed, the method comprising: connecting a first device to a second device, the first device being portable; receiving a preliminary plan for at least one planned location at a work site from the second device; receiving actual geographical data associated with the at least one planned location at the work site; inputting additional data associated with the received geographic data; and supplementing the preliminary plan with the geographic data and the associated additional data. In the exemplary method, the process of supplementing the preliminary plan may comprise overlaying the geographic data and the associated additional data on the preliminary plan. Further, inputting the additional data may comprise retrieving predetermined data from at least one of the first device and the second device.

The exemplary method may further comprise: sending the supplemented preliminary plan to the second device; automatically finalizing the preliminary plan; generating an order based on the finalized plan; and forwarding the order to a project manager for implementation. The exemplary process of generating the order may comprise identifying at least one item to be placed at the at least one planned location based on the geographic data; and determining an availability of the at least one item from a database.

In a further exemplary aspect of the disclosure, a method for surveying a location is disclosed. The disclosed method comprises: receiving, at a first device, position data from a geographic position determining system, the position data corresponding to at least one geographic point at the location; entering notes in the first device corresponding to the received position data; storing the notes and the position data corresponding to the at least one geographic point in a first memory of the first device; and generating a plan from the stored notes and position data. The process of generating the plan may comprise: connecting the first device to a second device; synchronizing the first device to the second device; downloading the stored notes and position data to the second device; associating the downloaded notes and position data with a preliminary plan; and overlaying the associated notes and position data on the associated preliminary plan. Further, the process of entering notes may comprise completing predetermined fields provided on a displayed preliminary plan and/or selecting at least one element from a plurality of predetermined descriptive elements displayed at the first device.

In view of the above, the present disclosure through one or more of its various aspects and/or embodiments is presented to accomplish one or more objectives and advantages, such as those noted below.

In view of the above, the present disclosure through one or more of its various aspects and/or embodiments is presented to accomplish one or more objectives and advantages, such as those noted below.

In the following description of the illustrated embodiments, references are made to the accompanying drawings, which form a part hereof, and in which is shown by way of illustration, various embodiments in which the disclosure may be practiced. It is to be understood that other embodiments may be utilized, and structural and functional changes may be made without departing from the scope and spirit of the present disclosure.

Referring to FIG. 1, a description is now provided of an illustrative embodiment of a general computer system 100, on which the method and system for automated planning using geographical data can be implemented. The computer system 100 can include a set of instructions that can be executed to cause the computer system 100 to perform any one or more of the methods or computer based functions disclosed herein. The computer system 100 may operate as a standalone device or may be connected, e.g., using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, e.g., a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g., software, can be embedded. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Using a general computer system as shown in FIG. 1, a process for automated planning using geographical data may be provided. The system of FIG. 1 can also operate as various elements within the system. For example, a program implementing the disclosure may be loaded and executed on one or more computers.

Figure 2:
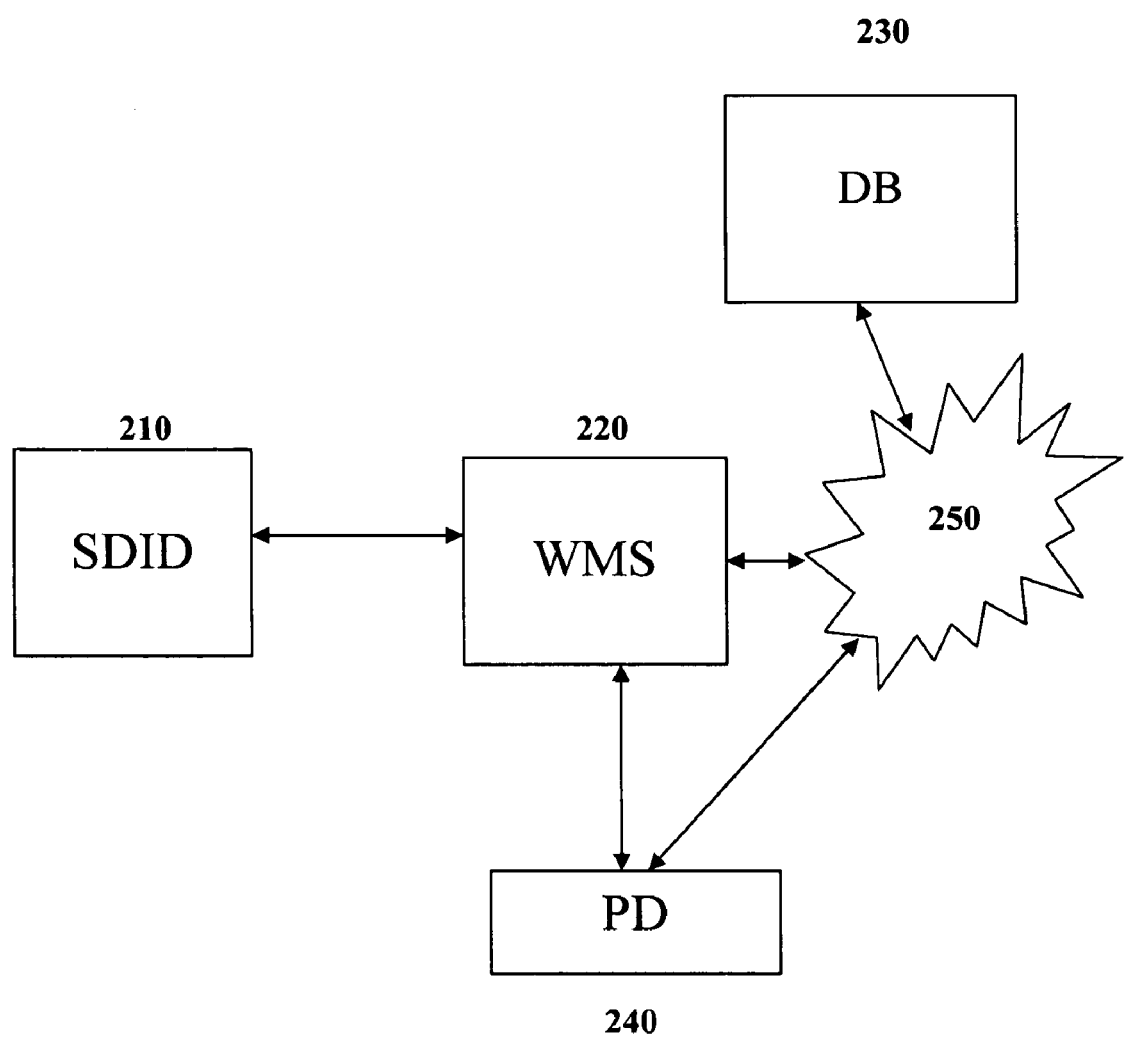
FIG. 2 illustrates an exemplary block diagram showing a generic system architecture, according to an aspect of the present disclosure.

FIG. 2 is an exemplary illustration of the data management system according to an embodiment of the present disclosure. In this particular example, a smart data input device (SDID) 210 is connectable to a work management station (WMS) 220. The WMS is connectable to a database (DB) 230 and a peripheral device (PD) 240. The SDID 210, WMS 220, PD 240 and DB 230 are connectable to each other through any known medium, including cable, radio frequency transmission, infrared beam signaling, laser signaling, or any other means capable of transmitting information.

The SDID 210 may be a handheld computer device, for example, and include the structure illustrated in FIG. 1, denoted as 100, without deviating from the spirit and scope of the disclosure. The SDID 210 has a plurality of interface ports (not shown) for receiving supplemental devices. The exemplary user interface of the SDID 210 will be described in greater detail below, with reference to FIG. 5. The SDID 210 includes the capability to determine geographical position information. For example, the SDID 210 may include an integral GPS receiver that receives radio signals from a constellation of GPS satellites, which broadcast precise timing signals, to accurately determine geographic position information (including longitude, latitude, and altitude). In alternative embodiments, the SDID 210 may collect geographical position information from any space or terrestrial based positioning system, without departing from the spirit and scope of the present disclosure.

Exemplary, supplemental devices that are useable with the SDID 210, and that form another aspect of the disclosure include: a laser rangefinder module for optically determining distances to targets; a satellite signal transceiver module for enabling communication between the SDID 210 and a satellite, or remote base stations via satellite uplink; a memory card module for increasing memory capacity of the SDID, or for enabling secure, physical transfer of data; a telephone transceiver to enable mobile or landline telephone communication between the SDID user and remote parties; a radio frequency transceiver module for enabling two-way radio frequency communication or remote control of peripheral devices such as surveying robotic machines; a digital camera device module for enabling recording of still or moving picture images; a bar code scanner module for enabling machine retrieval of data recorded on bar codes; a simulator module that provides computer based tutorials for training the user of the SDID; a gas sensing module; a volt/ohm/amp/inductance meter module for measuring voltage, resistance, current and/or magnetic fields; an infrared transceiver module; an infrared sensor module; a water moisture sensor module; a temperature sensor module; a gaming module for providing entertainment for the user; a head-mounted display module that would be connectable to a head-mounted display and control, which may include eye-tracking technology; or any combination of the above listed accessories.

The WMS 220 in one embodiment may be any general purpose computer that is capable of supporting computer aided design and drafting (CADD) processing software, for example, or any smart technology that is capable of performing the requisite functions. The WMS 220 may include the structure illustrated in FIG. 1, for example, without deviating from the spirit and scope of the disclosure. The WMS 220 may be a virtual computer that is essentially a network of remotely located computers, processing in parallel to provide a user with the perception of a single, standalone computer, but offering much greater speed and memory capacity.

The WMS 220 may include an expert system, for example. The exemplary expert system uses an adaptive neural processing system to provide an adaptive, self-learning system. The expert system is capable of generating draft work prints (including topographic survey plats where available), actual work prints, and/or work order prints. However, any other management system software may be used without deviating from the spirit and scope of the disclosure.

The WMS 220, is connectable to a peripheral device (PD) 240, which may be, for example, a printer. However, the PD 240 may include at least one other computer, a database, a local area network, a wide area network, a satellite signal transceiver, a database, a wireless transceiver, a display (including holographic, projection, micromirror device, light emitting diode, or the like), facsimile machine, camera device, satellite transceiver, or any of the supplemental devices described above that may be used with the SDID 210. The PD 240 may also be connected to WMS 220 through a network 250. Once connected to the network 250, the PD 240 is configured to communicate with any other compatible device, or devices that are also in communication with the network 250. In the exemplary embodiment, the PD 240 is connectable to both the WMS 220 and the network 250.

The WMS 220 is also connectable to a database (DB) 230 for retrieving and storing data. The WMS 220 is connectable directly to DB 230, or indirectly through a network 250, as shown in FIG. 2. The network 250 may include, for example, an Ethernet, a private intranet, the public Internet, or a wireless local area network (LAN), or any combination thereof. DB 230 may be located on site as a stand alone unit, or as an integral part of the WMS 220; or, the DB 230 may be located remotely. If located remotely, the DB 230 may be provided by a vendor. The skilled artisan would readily appreciate that any large data store with data management functions may be used for the DB without deviating from the spirit and scope of the disclosure.

The SDID 210, WMS 220, PD 240, DB 230 and network 250 are connectable by any known medium. For example, the four systems are connected using a high bandwidth, low resistance cable. However, the systems may be coupled using wireless linkage such as radio frequency, infrared, or laser-optic, or any combination thereof. The skilled artisan would readily appreciate that any communication medium that is capable of transmitting analog and/or digital signals may be used to connect the SDID 210, WMS 220, PD 240, DB 230 and network 250, without departing from the spirit and scope of the disclosure.

Figure 3:
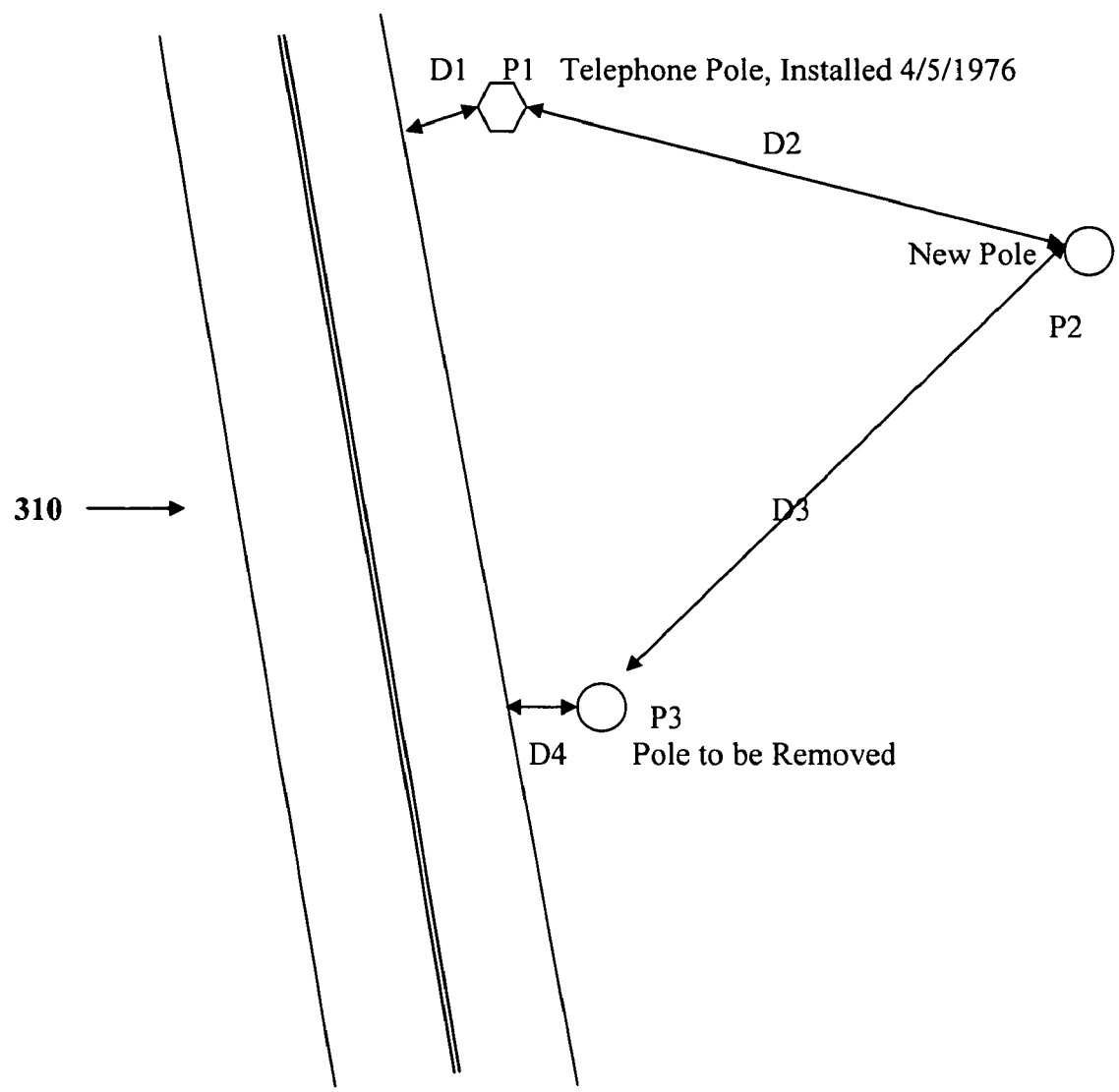
FIG. 3 is an exemplary survey site, according to an aspect of the present disclosure.

FIG. 3 illustrates an exemplary site which is to be surveyed using the SDID 210 to collect data of a field site. The site survey will be described below in conjunction with the flow charts illustrated in FIGS. 4A and 4B.

Referring to FIG. 4A, the WMS 220 receives a job request at step S410. The job request may be generated at the WMS 220, or it may be generated at some other location and transmitted to the WMS 220. The job request includes, for example, a project site address and preliminary instructions. The preliminary instructions may include a description of the project site, including the type of site (e.g., building site), the nature of work that should be performed on or with respect to the site, and any other relevant instructions necessary to communicate the information to complete the work on the project site. The request may, for example, be generated by an user on the SDID 210 and downloaded to the WMS 220. Alternatively, the request may have been generated directly on the WMS 220, or it may have been generated remotely and communicated to the WMS 220 by email, facsimile, instant messaging commands or any other known communication technology.

Upon receiving the job request, the WMS 220 creates a project folder at step S415. The project folder provides an easily retrievable location for accessing and managing necessary data and programs for accomplishing a given project. WMS 220 may also generate links to other data and programs that will likely interface with the newly created folder. For example, once the address is provided, WMS 220 may establish communication, e.g., over the Internet, with vendors to retrieve current inventory and pricing information that is typically needed for the project for which it has received instructions at step S410.

At step S420, the WMS 220, using the smart technology discussed above, builds project data into the project folder. For example, the WMS 220 may use the address it received at step S410 to retrieve survey plats for the address location, as well as survey plats for adjoining locations. WMS 220 may retrieve the plats from the database DB 230, which in this case may be a public records database managed by the County, a vendor that is able to provide the necessary plats, an historical internal database of previous projects, or the like. WMS 220 then retrieves any data associated with the address it finds and loads the information into a newly created project file. For example, WMS 220 may retrieve data it has located regarding pre-installed telephone poles, electrical power lines, fences, underground fiber optic lines, distribution boxes, hazardous conditions, etc. At step S425, WMS 220 loads all of the relevant data for the project into the project file.

At step S430, the WMS 220, using the up-to-date data, proceeds to process the information to generate a draft work print. The exemplary draft work print will include a topographical survey plat with locations and annotations overlaid onto the plat. The annotations may include descriptions and locations of various known site features, such as the above mentioned telephone poles, electrical power lines, fences, hazards, etc. The survey plat may be a two-dimensional plat with appropriate demarcations. However, where topographical information is critical, a three-dimensional (or greater) plat may be used in order to convey a more accurate, real-world plat to the field engineer.

At step S435, the SDID 210 is coupled to the WMS 220 to upload the draft work print. This may be accomplished by implementing a dedicated SDID cradle (not shown) and locating it on premises with WMS 220. The dedicated cradle would provide an interface whereby the information on the SDID 210 would be synchronized with corresponding information on the WMS 220 in order to ensure that each system has the most up to date information. Any known synchronization methodology may be used, including time stamp comparison, version control, or any other scheme that works within the spirit and scope of the disclosure. Alternatively, SDID 210 may upload the information from the WMS 220 from a remote location over a satellite link, telephone line, Internet connection, radio frequency connection, optical signal connection, or any other transmission medium that can facilitate transmission of digital or analog information between two locations.

In alternative embodiments, any or all of steps S410 through S435 may be performed on the SDID 210 instead of the WMS 220 without departing from the spirit and scope of the present disclosure. Further, these steps may have been performed on another WMS device and made available to the WMS and/or the SDID 210 in real time or through a data store.

Regardless of whether the draft work print has been generated in the WMS 220 and downloaded on to the SDID 210, or generated in the SDID 210 itself, once the draft work print is on the SDID 210, the SDID 210 is taken to a project site to carry out the necessary survey steps, as illustrated in FIG. 4B, for example.

At step S450, the user may physically go to the project site and retrieve the draft work print on the SDID 210. Alternatively, and especially if it is a highly hazardous project site, the user may choose to send a robot to gather the necessary information. The robot may be a land, water, or air-traversing machine, which may be equipped with artificial intelligence and may be configured to receive instructions from the field engineer.

FIG. 3 shows an example of a draft work print of the type retrieved at step S450. The exemplary draft work print shown in FIG. 3 includes a roadway 310 and a preloaded geographic point P1, with a notation, e.g., "Telephone Pole, Installed Apr. 5, 1976." The user then, for example, walks to point P2. Upon arriving at P2, at step S455, the user may select the point (using the SDID 210, as described below) as a geographic point. By indicating that P2 is a geographic point, the SDID 210 automatically reads the geographic data from the GPS receiver, for example, corresponding to the geographic location of P2. The SDID 210 stores the geographic location data in association with P2, including longitude, latitude and altitude. One example of a GPS device which may be used in conjunction with the present disclosure is the MobileMapper™ CE, which provides for real-time GPS performance, integrated Bluetooth™ wireless technology, field-replaceable SD card memory and Li-ion battery, alphanumeric keypad, touch-screen, all enclosed in a waterproof casing.

After selecting the geographic point, at step S460 the user inputs specific notes on the SDID 210 corresponding to the selected point. The SDID 210 may be configured to include an auto-check function that allows the user to obtain updates for selected geographic points. For example, the desired location or intended purpose of P2 may have changed. The SDID 210 may check for updates by performing a data check on data stored in the SDID 210. However, the update check may be performed by sending a call signal to the WMS 220 to check for status updates, and if any are found, to upload the updated information to SDID 210 by any one of the communication medium described above.

At step S465, the SDID 210 overlays the input geographic positions and location specific notes on to the draft work print so that the user may see the progress as he or she proceeds to survey the project site. At step 470, the user is queried as to whether he or she wishes to select another geographic point, enter additional notes or other information, or finalize the draft work print. In the example of FIG. 3, the user elects to proceed from P2 (e.g., where the draft work print indicates a request for a "New Pole" to be installed) to point P3. At point P3, in the example shown in FIG. 3, the process returns to step S455. The user selects the point as a geographic point at step S455 and receives the corresponding location data, and enters a note, e.g., "Pole to be Removed," at step S460. The SDID 210 may display respective distances D1, D2, D3 and D4 for the distances from the roadway 310 to pole P1, from pole P1 to pole P2, from pole P2 to pole P3, and from pole P3 to roadway 310, respectively. Upon the next prompt for further geographic points, i.e., step S470, the user elects to finalize and the subroutine of FIG. 4B ends.

Referring back to FIG. 4A, once the draft work print has been finalized, the SDID 210 is again connected to the WMS 220, either by hard wire or wireless, and the finalized draft work print is downloaded to the WMS 220 at step S440. At step S445, the WMS 220 generates a final work print and a work order based on the down-loaded information. The final work print will be a final version of the draft work print, including all site specific data collected by the user, that has been approved by the field engineer or any other necessary party. The actual work print and the work order may be stored (and a backup copy may be archived) by the WMS 220 into, for example, the database DB 230 or in a local memory at step S446.

The work order may be forwarded to an entity charged with physically completing the project. The work order may include, for example: a project identification; a project location; specific material necessary for the project; specific tasks that must performed at the project; an estimation of the time necessary to complete each of the tasks; and/or a cost associated with each of the tasks and the specific material to be used. The work order may also include detailed information, such as: cable type; cable size; cable length; terminal type; terminal count; terminal size; splice points; closures; poles and the like, which are necessary to carry out a project to completion. The work order may also include a job budget based on pricing and inventory information, job management time codes for specific tasks enumerated in the work order, and any other information that affects the overall project budget. The WMS 220, in generating the job budget, will access the most up to date cost and inventory data for supplies from vendors as discussed above. The WMS 220 will then compile and generate the work order with the most current information, including a job budget. If it is determined that inventories are insufficient to support the needs of a specific work order, the WMS 220 can send requests for vendors to replenish stock, to stock certain new items, or any other similar request. In an embodiment, the WMS 220 automatically generates the information detailed in the work order, by accessing various databases and calculating cost, budgets and the like.

In an exemplary embodiment, the work order is forwarded to a general contractor that has been delegated the responsibility of overseeing construction of the project in accordance with the work order and actual work print. In the exemplary embodiment, the general contractor then dispatches a crew to the project site to complete the project in accordance with the work order and actual work print.

However, the skilled artisan will appreciate that the present disclosure is not limited to surveying and documenting potential work sites, and that the charged entity may be any entity assigned the task of completing the project in accordance with the work order and actual work print without departing from the spirit and scope of the disclosure. The disclosure may be equally used in any environment requiring determination of specific geographic locations and association of various notes readily associated with those locations, including relationships with other specific geographic locations. For example, the disclosed system and process may be used with respect to construction sites, retail or wholesale stores, real estate, hydrographic survey sites, offshore and land core drilling sites, dredge sites, law firms, and the like. For example, the disclosure may be used by law firms in order to inventory files that are spread across the law firm building(s); by libraries to inventory books and their respective locations; by census poll takers to collect census data; by freight and shipping entities to track specific container inventories and locations.

The disclosure may likewise be used in the retail and wholesale industries to manage inventory. In this aspect of the invention, a store clerk may use the SDID 210 to inventory stock that is located on premises in a store, including its specific location and quantity, and any notes that the clerk may decide to include with respect to the location and items. Instead of manually entering stock item identifying codes, the SDID 210 may be fitted with the scanning device module discussed above to enable the clerk to scan universal product code (UPC) labels printed on the items.

Figure 5:
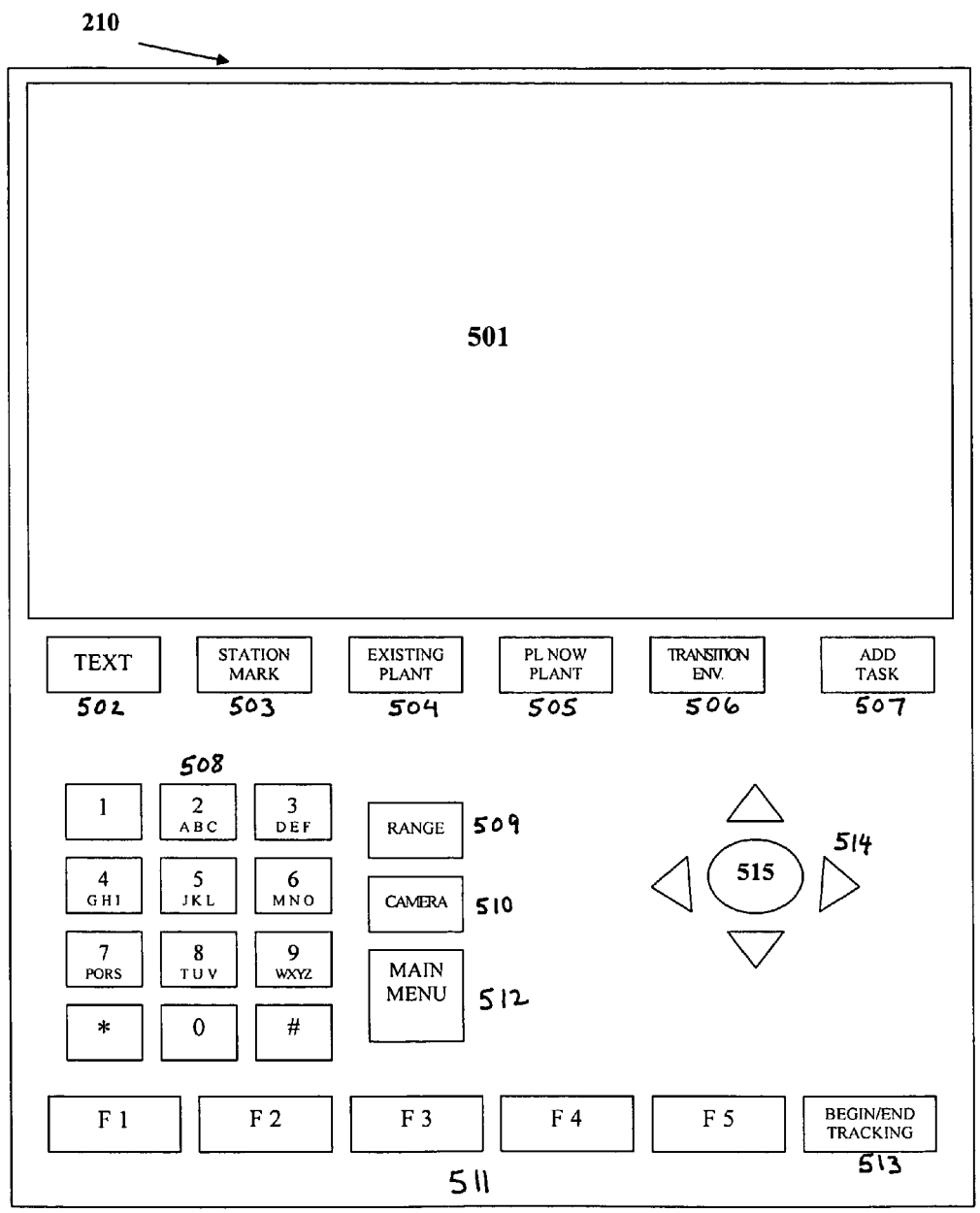
FIG. 5 illustrates an exemplary smart data input device, according to an aspect of the present disclosure.

Next, a detailed description of an exemplary embodiment of the SDID 210 will be provided. Referring to FIG. 5, the exemplary SDID 210 includes a display 501, an embedded digital compass (not shown), QUICK keys 502-507, numeric keypad 508, RANGE key 509, CAMERA key 510, FUNCTION keys (F1-F5) 511, MAIN MENU key 512, BEGIN/END TRACKING key 513, directional keys 514, and pivotal member 515. The exemplary SDID 210 may be enclosed in ambient-proof casing that is water proof, drop resistant and temperature resistant. FIG. 5 is an exemplary embodiment of the SDID 210, but the skilled artisan will readily recognize that the disclosure is not limiting to the exemplary embodiment, modifications and/or replacements may be made without departing from the spirit and scope of the disclosure.

The MAIN MENU key 512, when activated, triggers the SDID 210 to display a main menu on display 501. The user is then able to select a wide variety of functions from displayed items, including configuration and control of various supplemental devices. The user is also able to control most of the SDID 210 processes by initiating the MAIN MENU and maneuvering through its contents using the directional keys 514 and/or the pivotal member 515.

The directional keys 514 and pivotal member 515 are provided to enable the user of the SDID 210 to manipulate a cursor on the display 501 through a graphic user interface (GUI) (not shown). Keys 514 and 515 provide a user-friendly interface, enabling the user to mimic the functionality of a multidimensional computer mouse. The directional keys 514, for example, allow the user to manipulate a cursor on a draft work print displayed on the display 501 to modify objects and their locations. The pivotal member 515 allows for further manipulation of the same cursor, or an additional cursor for multidimensional manipulation of displayed data on display 501. The pivotal member, in an exemplary embodiment, is a pivotal joystick that operates in 360 degrees, with a push down to select feature. Of course, any functionality enabling manipulation of a cursor on the display 501, such as a touch pad, may be included on the SDID 210 without departing from the spirit and scope of the present disclosure.

The user is able to record a continuous line of geographic points by depressing the button BEGIN/END TRACKING 513 once to start tracking and a second time to stop the tracking. This function key allows the SDID 210 to record a line of geographical points that a user traverses while moving from an initial point (when the key 513 was depressed a first time) to an ending point (when the key 513 was depressed a second time) using GPS data. This function key is practical in enabling the user to record fence lines or power lines, for example, on a draft work print.

Selection of the CAMERA key 510 will activate digital camera functionality (not shown), which may be integral to the SDID 210 or connectable through one of the interface ports of the SDID 210. Upon activation of this key, the display 501 will display the optical field that may be captured by the digital camera. Control of the digital camera is facilitated through touch screen soft keys that are displayed to the user along the lower most region of the display 501 (not shown), and/or through pivotal member 515.

The RANGE key 509 enables the user to select geographic points from a distance using an optical range finder (i.e., when the SDID 210 is equipped with a supplemental range finder module) and the digital camera discussed above, without having to physically stand at the point which is to be selected as a geographic point. For example, activation of RANGE key 509 activates the supplemental range finder module and the internal digital camera to display a field of view on to the display 501, as well as obtain measured distances to an object selected on the display 501 and display such distances. The object may be targeted by overlaying a cross-hair or cursor on the displayed image field, enabling the user to select an object using either of keys 514 or 515. Thus, the user is able to manipulate the cross-hair or cursor to overlay a selected target object and to select it as a geographic point, along with its positional information. The positional information is automatically determined using the known geographic position where the user is standing (e.g., through receipt of GPS information) and the range to the target object. This feature allows the user to obtain geographic points that may otherwise be practically unattainable. Alternatively, the range finder may be used to target the object without use of the camera device.

Function keys F1 to F5 are programmable keys that are programmable through manipulation of the MAIN MENU key 512 and/or an ADD TASK key 507. The function keys F1 to F5 may thus be programmed to serve as extra QUICK keys, in addition to QUICK keys 502-507, or they may be programmed to serve as activation keys for supplemental devices that may be later coupled to the SDID 210. For example, the key F1 may be programmed to activate a simulation module or a computer based training module, which can be used to train new users on the use of the SDID unit and/or surveying methodology.

Figure 6:
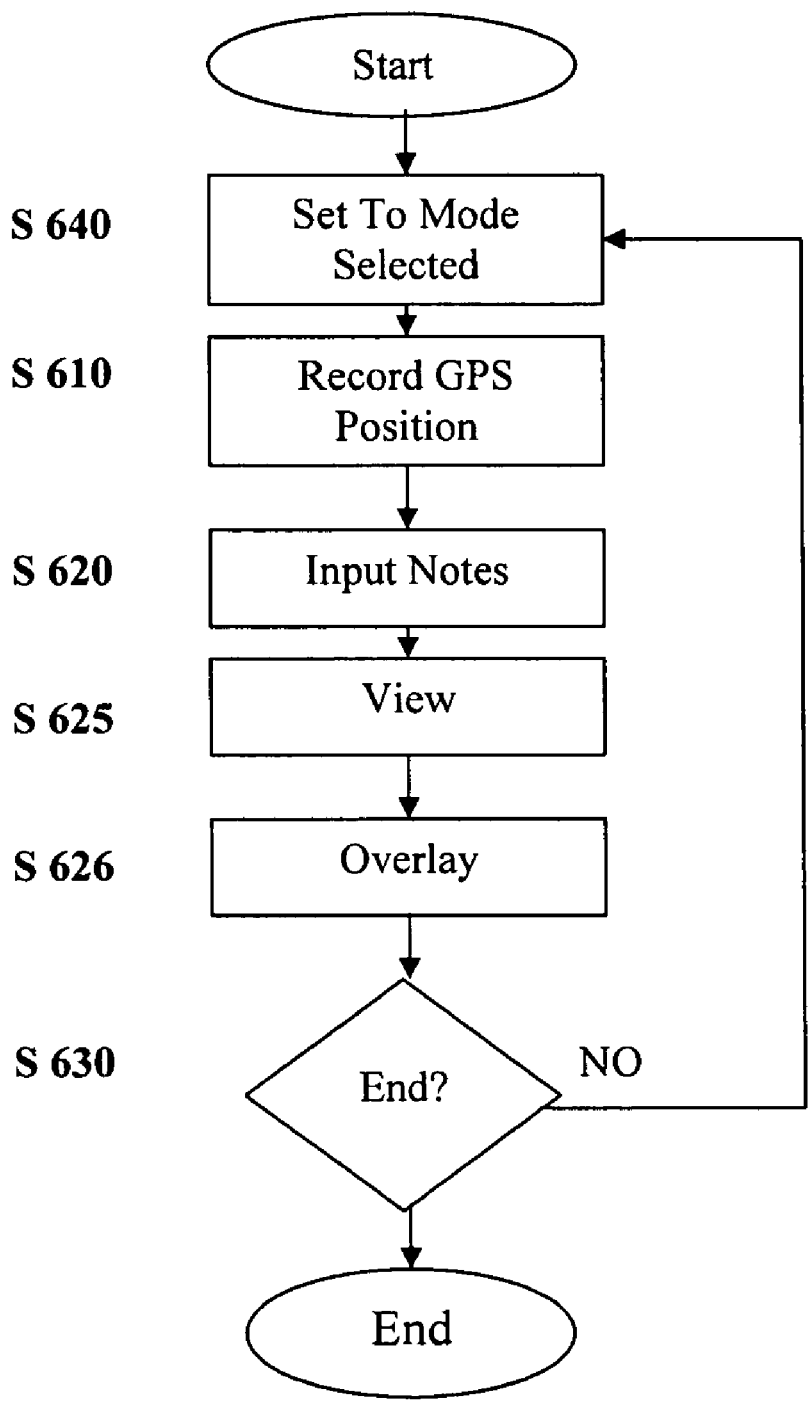
FIG. 6 illustrates a flow diagram of exemplary processes performed upon activation of a QUICK key on the smart data input device, according to an aspect of the present disclosure.

FIG. 6 shows an exemplary embodiment of the QUICK key features. Selection of any one of the QUICK keys 502 to 506 will cause the SDID 210, at step S605, to set the QUICK key mode to the mode selected. The SDID 210 is then ready for the first selection of a geographic point (i.e., a GP point). At a first selection of a geographic point, as described above, the SDID 210 determines that a selection has been made and proceeds to record the corresponding coordinates at step S610. At step S620, the SDID then prompts the user to enter notes for the corresponding geographic point. The default input data entry mode is set to the QUICK key mode, described later in greater detail with respect to FIGS. 7 and 8. The SDID 210 also checks for updated information for the corresponding geographic point; and if any is found to exist, the SDID 210 displays the new information at step S625 before overlaying the information onto the draft work print at step S626. Then, at step S630, the user is prompted as to whether data entry has been completed. If it has, then the routine ends, otherwise it loops to step S610 to receive geographic position information for another point.

Figure 7:
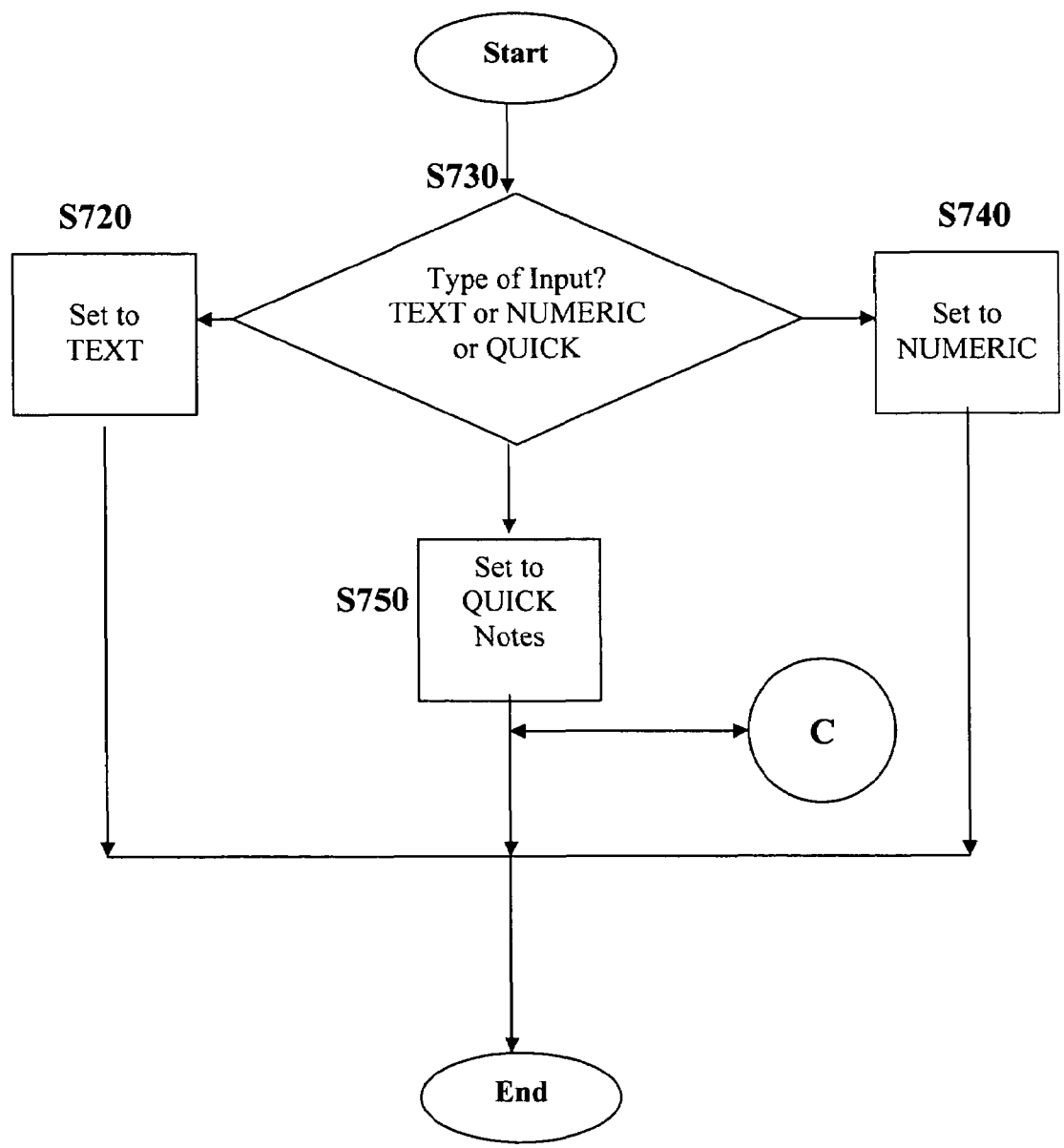
FIG. 7 is a flow diagram of an exemplary process performed upon activation of a key on the smart data input device, according to an aspect of the present disclosure.

Referring specifically to the QUICK keys depicted in FIG. 5, when the user activates the TEXT key 502, the QUICK default entry mode is overridden and the SDID 210 proceeds to the data entry mode selection process shown in FIG. 7. Referring to FIG. 7, activation of the TEXT key 502 will open up a scroll menu on display 501 offering the options of text entry, numeric entry or quick entry at step S730. Upon selecting one of the input modes at step S730, the SDID 210 will proceed to the corresponding one of steps S720, S740, or S750. When the text mode has been selected at step S730, the SDID 210 will set the input mode to text at step S720. This enables the user to use the letters depicted on the keypad 508 to manually type words. For example, to obtain letters on the same numeric key, the user presses the key multiple times in quick succession until the desired letter is displayed. When, instead, the numeric mode has been selected at step S730, the SDID 210 will enable numeric entry at step S740. This enables the user to use the numbers depicted on the keypad 508. When the quick entry has been selected, the SDID 210 will enable quick entry at step S750, which may display additional predetermined or preprogrammed quick entry options for which no QUICK key presently exists. In an embodiment, the TEXT mode enables a user, e.g., to type in information using an attachable keypad or an integral iTAP feature.

Figure 8:
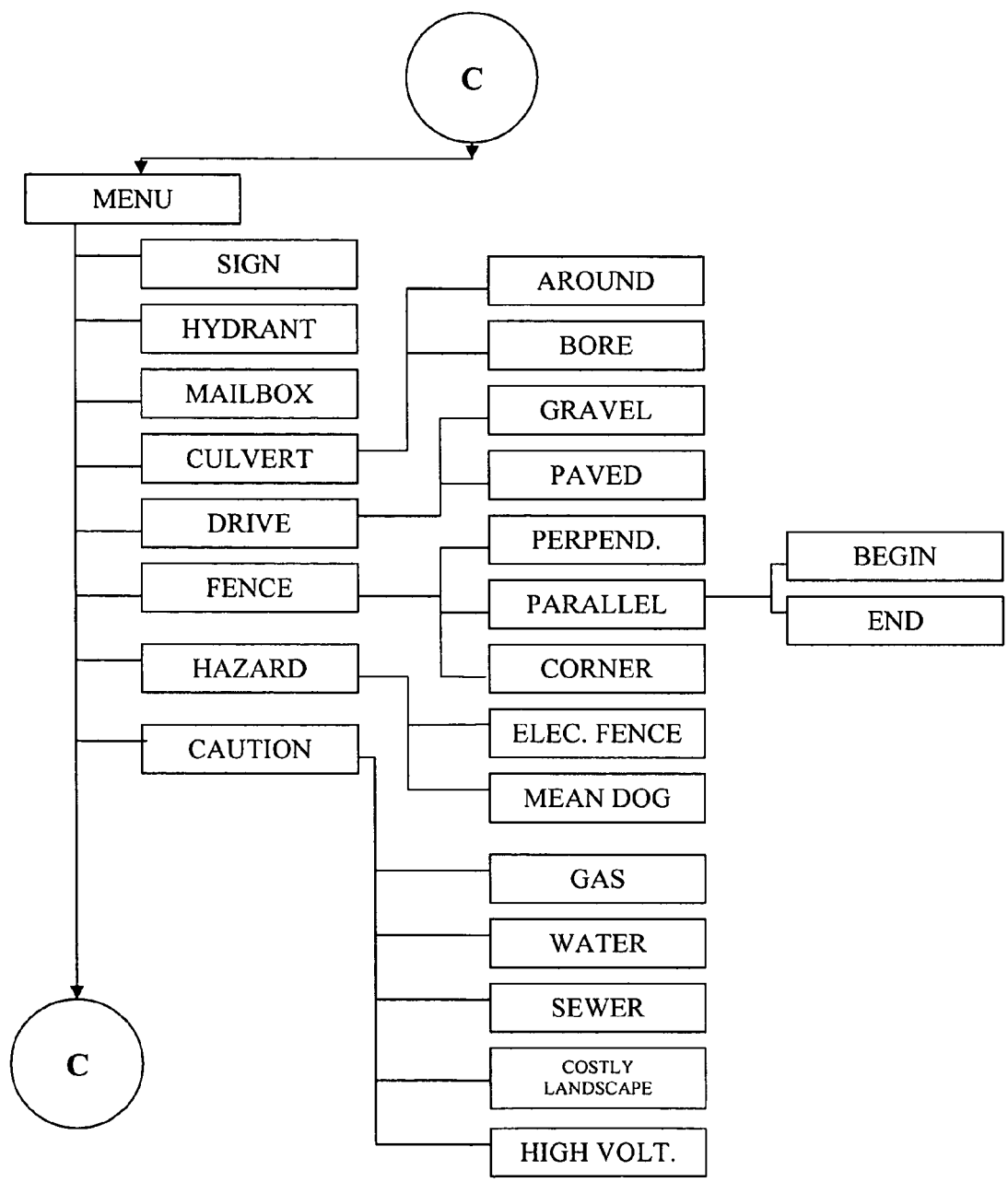
FIG. 8 is a flow diagram of an exemplary task menu displayed on the smart data input device, according to an aspect of the present disclosure.

For an exemplary quick entry menu, a hierarchical listing of terms may appear in display 501 as illustrated in FIG. 8. In this example, the user may maneuver through different commonly used terms by using keys 514 and/or 515, which he or she may want to include in the notes associated with a particular geographic position. The commonly used terms, displayed in FIG. 8, are hierarchically displayed in multi-tiers. For example, SIGN, HYDRANT and MAILBOX are single tiered. Selection of any of these three terms, for example, will only insert the term into the draft work print at the corresponding geographic point.

Alternatively, the descriptors CULVERT, HAZARD and CAUTION are predefined as two-tiered and FENCE and DRIVE are predefined as three-tiered. Thus, a selection of CULVERT will open up the options of AROUND or BORE for selection, describing two common types of culverts that may be present on site. A selection of HAZARD will open up the options of ELECTRIC FENCE or MEAN DOG for selection. A selection of CAUTION will open up the options of GAS, WATER, SEWER, COSTLY LANDSCAPE or VOLTAGE for selection.

A selection of FENCE, on the other hand, will open up the options of CORNER, PERPENDICULAR OR PARALLEL, with a further selection of PARALLEL, for example, opening up further options of BEGIN or END for selection. This then prompts the user to enter geographic position data corresponding to the beginning or the end of a fence line. A selection of DRIVE will open up the options of GRAVEL or PAVED, likewise followed by a further selection option of BEGIN or END.

In alternative embodiments, the quick entry may also include, for example, the "iTap" technology used by MOTOROLA™ for quick entry of commonly used characters and words. Further, the quick entry may also include preprogrammed lines of text that the user would expect to enter on site, allowing the user to avoid excessive text entry for predictable items.

Referring back to the QUICK keys depicted in FIG. 5, activation of the STATION MARK key 503 will set the Mode to STATION MARK at step S605 of FIG. 6. The causes the SDID 210 to go through essentially the same steps as described above. In particular, the SDID 210 prompts the user to record the GPS location data associated with the selected location (e.g., the location at which the user is presently standing or a remote location identified through use of the RANGE key 509) as a GP point, i.e., at step S610. Then at step S620, the SDID 210 prompts the user for data entry notes. In the exemplary embodiment, quick entry mode, discussed above, is set by default. Thus, the menu of FIG. 8, for example is automatically displayed, showing common terms in a hierarchical format on display 501. The user may then maneuver through the displayed menu, e.g., using keys 514 and/or 515, to select the desired notes. The SDID 210 also displays new information at step S625 and overlays the information collected at steps S610, S620 and S625 onto the draft work print at step S626. Upon completing data entry for the respective GP point, the SDID 210 will prompt the user at step S630 whether the survey project is complete.

Figure 9A:
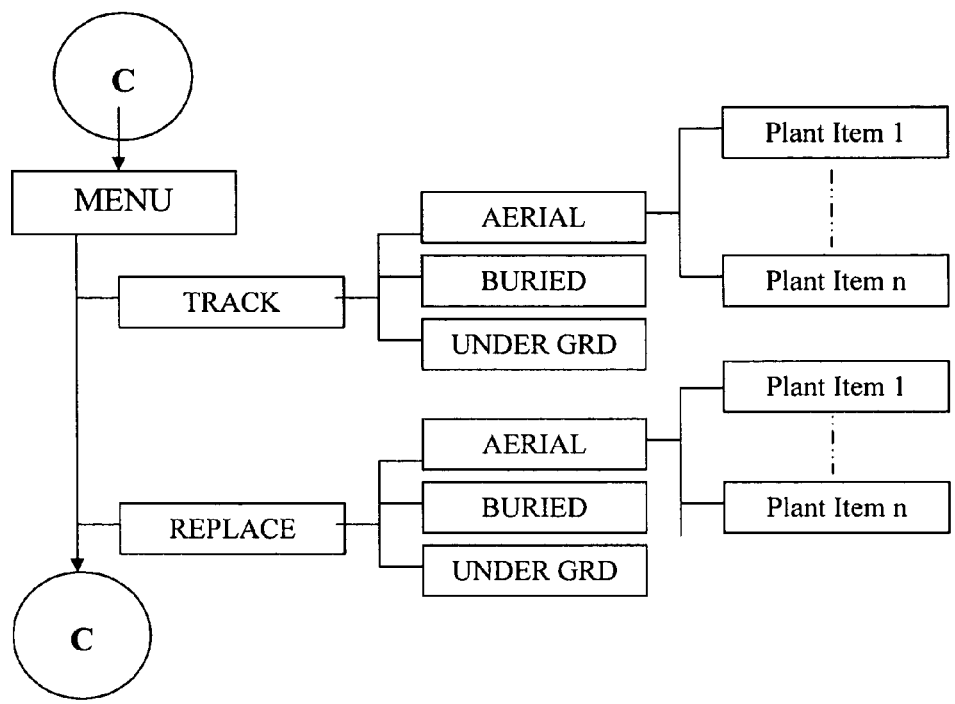
FIGS. 9A and 9B are flow diagrams of exemplary task menus displayed on the smart data input device, according to an aspect of the present disclosure.
Figure 9B:
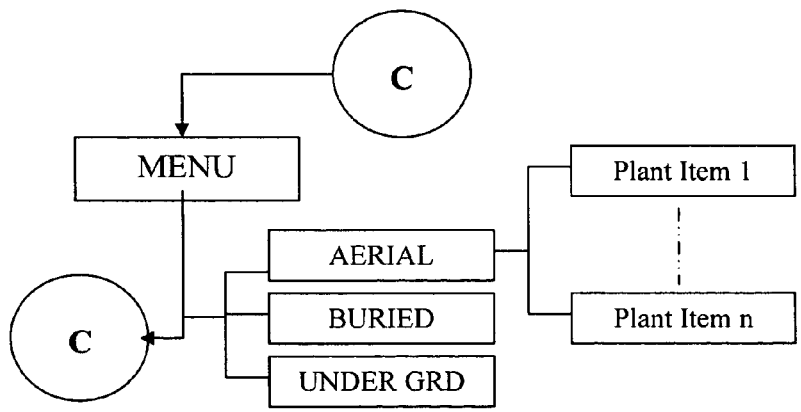

Activation of the EXISTING PLANT key 504 or PLACE NEW PLANT key 505 will cause the SDID 210 to go through the same steps as described above with respect to selection of the STATION MARKER key 503, except that instead of displaying the quick entry menu illustrated in FIG. 8 at the data entry step S630 in FIG. 6, the SDID will display the quick entry menus shown in FIGS. 9A and 9B, respectively, at data entry step S630.

Referring to FIG. 9A, activation of key 504, will present the user with menu selection options TRACK and REPLACE on display 501, which may refer to some element of the physical plant, such as a power line or cable. Upon selecting TRACK, for example, the user will be presented with three further selection options, i.e., AERIAL, BURIED, and UNDERGROUND, the selection of which indicates the status (or anticipated status) of the element. The AERIAL option corresponds to anything that is aerial by nature, including cables, power lines, branches, etc. The BURIED option corresponds to anything that is buried in the ground and that is in direct contact with the environment (e.g., soil, moisture, etc.). The UNDERGROUND option on the other hand, corresponds to anything that is underground and protected from the environment.

Upon selecting one of the three further selection options, the user will be given a predefined number of options for PLANT types for any one of the three further selection options. For example, the user may be given an n number of plant options (where n is a positive integer that represents the number of predetermined plant options), such as cable, cable size, cable gauge, etc.

The TRACK selection option automatically places the SDID 210_into a multi-GP point record mode so that the SDID 210 will track a geographical line that tracks and records the user's movement from initiation of the TRACK mode to its termination, similar to the functionality described above with respect to the BEGIN/END TRACKING key 513. It performs the tracking operation by regularly recording GPS positions at predetermined periods of time that are sufficient to generate an accurate representation of the item tracked (e.g., a power line) and its relationship to the project plat.

The REPLACE selection option automatically places the SDID 210 into a "replacement" mode. In this mode, once the user has selected REPLACE, the user then may select whether the structure to be replaced is AERIAL, BURIED, or UNDERGROUND, as discussed above. If the user chooses AERIAL, for example, then the user may select the PLANT ITEM that needs to be replaced (e.g., a telephone pole). The SDID 210 then automatically annotates the GP point with a notation that the telephone pole located at that GP point needs to be replaced.

FIG. 9B depicts activation of the PLACE NEW PLANT key 505, which presents the user with menu selection options, such as AERIAL, BURIED, and UNDERGROUND, as described above. Activation of key 505 enables the user to automatically record the GP position at which a new plant is to be placed, as well as enable the user to identify the specific plant item using the QUICK mode entry option. Selection of one of these three options will then present the user with a plurality of predetermined PLANT ITEM selection options, e.g., cable, cable size, cable gauge, etc.

Figure 10:
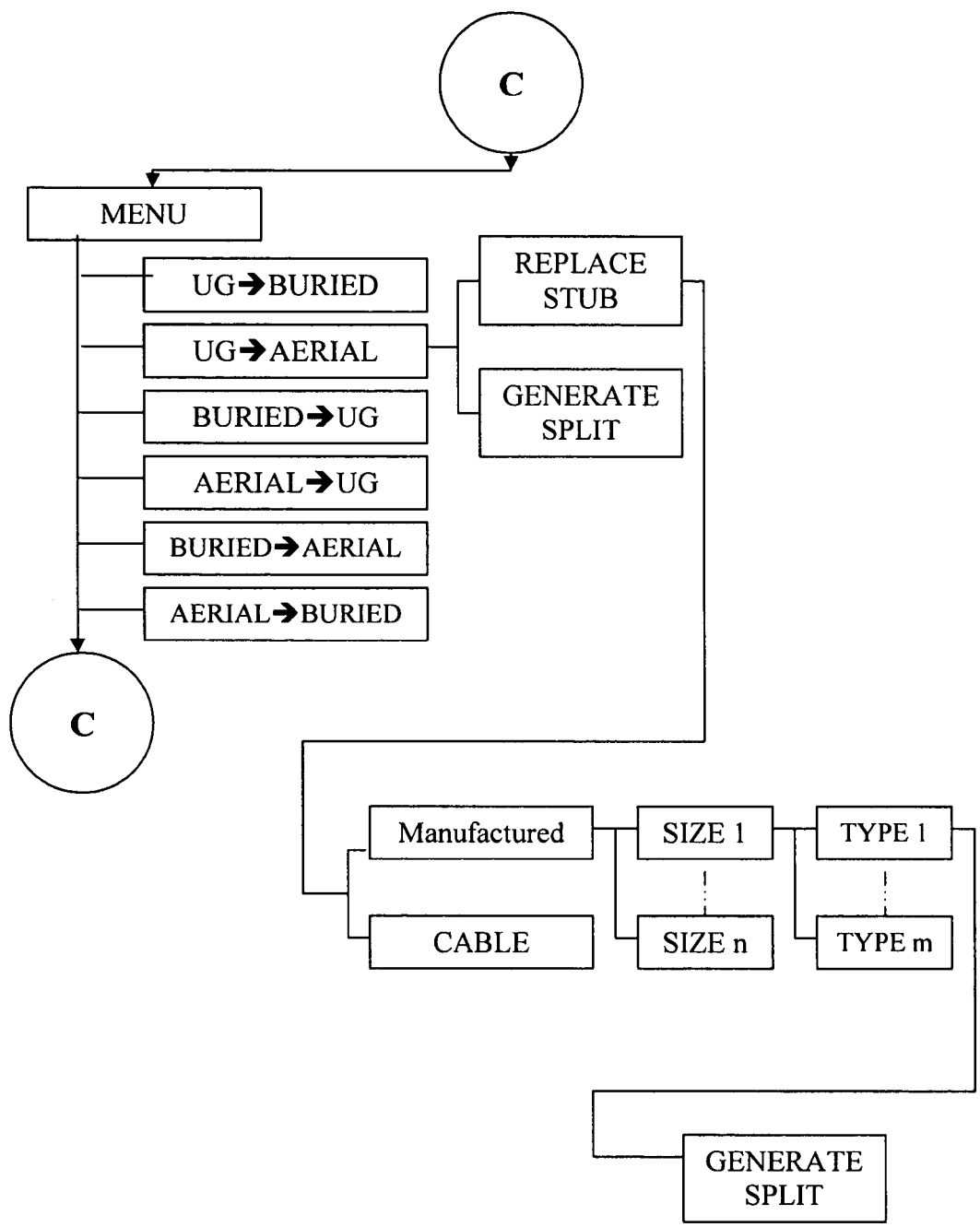
FIG. 10 is a flow diagram of an exemplary task menu displayed on the smart data input device, according to an aspect of the present disclosure.

Activation of the TRANSITION ENVIRONMENT key 506 in FIG. 5 will trigger recall and display of exemplary, predetermined, commonly used descriptors as illustrated in FIG. 10, for example. Referring to FIG. 10, activation of key 506 will prompt the user to select, for example, one of six predefined transitions. In the depicted embodiment, the user may select any one of the following transitions: UNDERGROUND to BURIED; UNDERGROUND to AERIAL; BURIED to UNDERGROUND; AERIAL to UNDERGROUND; BURIED to AERIAL; or AERIAL to BURIED. A selection of any one of the six options, for example, will cause the SDID 210 to further display the options of generating a split (i.e., GENERATE SPLIT) or replacing a stub (i.e., REPLACE STUB) at the respective GP point. If the user selects the option REPLACE STUB, the SDID 210 presents the further options of selecting a manufactured stub (i.e., MANUFACTURED) or a cable stub (i.e., CABLE). Selection of either MANUFACTURED or CABLE, will cause the SDID 210 to present a series of predetermined sizes, SIZE 1 to SIZE n, where n is a positive integer. Upon selecting one of the SIZE options, the user is presented with a predetermined number m of types (m is a positive integer that represents the number of predetermined sizes, where the size may be any real value), TYPE 1 to TYPE m. Finally, upon selecting one of the TYPE options, the SDID 210 generates a split (GENERATE SPLIT) at the respective GP point and annotates the draft work print accordingly.

Selection of the ADD TASK key 507 will display on the display 501 a plurality of predefined, additional functions that the user may wish to add to any of the above tasks associated with the above described functions. Common exemplary tasks that may be included are: PLOWING; TRENCH MECHANICAL; TRENCH BY HAND; TRENCH MISCELLANEOUS; SPLICE PIT; TRENCH EXPOSE LOWER CABLE; BORING UNDER ROAD; RESTORATION OF PROPERTY; HAND HOLE/MAN HOLE; RODING OF DUCTS; UNDERGROUND REMOVAL; MISCELLANEOUS UNDERGROUND; BUILDING/STRUCTURE; AERIAL PLACE/REMOVAL; AERIAL MISCELLANEOUS; POLES; POLES MISCELLANEOUS; ANCHORS; TRANSFER OF ARIAL PLANT; TREE TRIM; BURIED SERVICE WIRE WORK; LINEMEN HOURLY; CREW RATE; EQUIPMENT; and SPLICING TASKS to name a few.

Accordingly, the user is able to receive specific, geographic location data, collected on-site by a GPS receiver or the like, and efficiently input contemporaneous notes and other associated data. The user may build a previously generated draft plan, such as a preliminary work print, and subsequently download the collected data and observations for automatic production of a final work order and/or final work print. The exemplary SDID 210 of FIG. 5 depicts the various functions and capabilities to maximize efficiency for the user.

Although the present specification describes components and functions that may be implemented in particular embodiments with reference to particular standards and protocols, the invention is not limited to such standards and protocols. Each of the standards, protocols and languages represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope and spirit of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the invention is to be determined by the broadest permissible interpretation of the following claims and their equivalents, and shall not be restricted or limited by the foregoing detailed description.

Although several exemplary embodiments have been described, it is understood that the words that have been used are words of description and illustration, rather than words of limitation. Changes may be made within the purview of the appended claims, as presently stated and as amended, without departing from the scope and spirit of the invention in its aspects. Although the description refers to particular means, materials and embodiments, the invention is not intended to be limited to the particulars disclosed, but rather extends to all functionally equivalent structures, methods, and uses such as are within the scope of the appended claims.

What is claimed:

1. A portable device for collecting data at a geographic location, the device comprising:
   a memory that stores preliminary site information associated with the geographic location;

a receiver that receives geographic position data of at least one selected point at the geographic location, and that automatically checks for and receives an update for the at least one selected point, the update including a change in a desired location and a change in intended purpose for the at least one selected point;

an interface that enables a user to input data corresponding to the received geographic position data; and a processor that supplements the preliminary site information with the received geographic position data and the corresponding input data.

2. The device according to claim 1, wherein the receiver comprises a GPS receiver and the memory stores at least the supplemented site information.

3. The device according to claim 1, wherein the preliminary site information comprises a work print indicating at least one action to be performed at the location.

4. The device according to claim 1, wherein the preliminary site information comprises a topographical plat.

5. The device according to claim 1, wherein the preliminary site information comprises a warehouse plan including inventory information.

6. The device according to claim 1, further comprising:
at least one input/output port configured to be coupled to at least one supplemental device, comprising at least one of a satellite signal receiver, a radio frequency signal receiver, a memory card, a range finder, a telephone, and a camera.

7. The device according to claim 1, the interface comprising at least one function activation key configured to execute a predetermined function that provides at least one user selectable choice for the input data.

8. The device according to claim 1, further comprising:
a range finder that determines a distance to a remote object, the processor determining a geographic position of the remote object based on the received geographic position data and the determined distance to the remote object.

9. The portable according to claim 1, further comprising:
a camera that captures a still or moving image that may be displayed on a display of the interface, the memory storing the image in association with at least one of the geographic position data and the corresponding input data of the at least selected one point.

10. The device according to claim 1, further comprising:
a transceiver configured to communicate with a remote work station, the supplemented site information being downloadable to the work station through the transceiver.

11. A work management method comprising:
connecting a first device to a second device, the first device being portable;
receiving a preliminary plan for at least one planned location at a work site from the second device;
receiving actual geographical data associated with the at least one planned location at the work site, and automatically checking for and receiving an update for the at least one planned location, the update including a change in a desired location and a change in intended purpose for the at least one planned location;

inputting additional data associated with the received geographic data; and
supplementing the preliminary plan with the geographic data and the associated additional data.

12. The method of claim 11, wherein supplementing the preliminary plan comprises overlaying the geographic data and the associated additional data on the preliminary plan.

13. The method of claim 11, wherein inputting the additional data comprises retrieving predetermined data from at least one of the first device and the second device.

14. The method of claim 11, further comprising:
sending the supplemented preliminary plan to the second device;
automatically finalizing the preliminary plan; and
generating an order based on the finalized plan.

15. The method of claim 14, wherein generating the order comprises:
identifying at least one item to be placed at the at least one planned location based on the geographic data; and
determining an availability of the at least one item from a database.

16. The method of claim 15, further comprising:
forwarding the order to a project manager for implementation.

17. A method for surveying a location, the method comprising:
receiving, at a first device, position data from a geographic position determining system, the position data corresponding to at least one selected geographic point at the location;
entering notes in the first device corresponding to the received position data;
automatically checking for and receiving an update for the at least one selected geographic point, the update including a change in a desired location and a change in intended purpose for the at least one geographic point;
storing the notes and the position data corresponding to the at least one selected geographic point in a first memory of the first device; and
generating a plan from the stored notes and position data.

18. The method according to claim 17, generating the plan comprising:
connecting the first terminal device to a second device;
synchronizing the first device to the second device;
downloading the stored notes and position data to the second device;
associating the downloaded notes and position data with a preliminary plan; and
overlaying the associated notes and position data on the associated preliminary plan.

19. The method according to claim 17, wherein entering notes comprises completing predetermined fields provided on a displayed preliminary plan.

20. The method according to claim 17, wherein entering notes comprises selecting at least one element from a plurality of predetermined descriptive elements displayed at the first device.

* * * * *